(12) United States Patent
Kim

(10) Patent No.: US 7,992,615 B2
(45) Date of Patent: Aug. 9, 2011

(54) MANUFACTURING MACHINE OF PACKING MATERIAL INFLATED WITH AIR

(76) Inventor: Young Seok Kim, Seoul (KR)

(*) Notice: Subject to any disclaimer, the term of this patent is extended or adjusted under 35 U.S.C. 154(b) by 112 days.

(21) Appl. No.: 12/304,687

(22) PCT Filed: Jun. 15, 2006

(86) PCT No.: PCT/KR2006/002293
§ 371 (c)(1),
(2), (4) Date: Dec. 12, 2008

(87) PCT Pub. No.: WO2007/145386
PCT Pub. Date: Dec. 21, 2007

(65) Prior Publication Data
US 2009/0321020 A1 Dec. 31, 2009

(51) Int. Cl.
*B32B 37/00* (2006.01)
(52) U.S. Cl. ........ 156/361; 156/494; 156/498; 156/581; 156/583.1; 156/583.4; 53/403; 53/450
(58) Field of Classification Search ............ 156/361, 156/494, 498, 580, 581, 583.1, 583.4, 555, 156/582; 53/403, 450
See application file for complete search history.

(56) References Cited

U.S. PATENT DOCUMENTS

| 5,733,406 | A | 3/1998 | Knight |
| 7,225,599 | B2* | 6/2007 | Sperry et al. ............ 53/403 |
| 7,398,626 | B2* | 7/2008 | Greschbach ............ 52/650.3 |

FOREIGN PATENT DOCUMENTS

| JP | 06-100034 | 4/1994 |
| JP | 2004-306407 | 11/2004 |

* cited by examiner

*Primary Examiner* — James Sells
(74) *Attorney, Agent, or Firm* — Park & Associates, IP Law, P.C.

(57) ABSTRACT

The present invention is related to a shock-absorbing packing material inflated with air and to an apparatus for manufacturing the shock-absorbing packing material. As polystyrene plastic typically used for a shock-absorbing material becomes difficult to use because of environmental pollution, a shock-absorbing means that are formed by compiling plastic films or sheets, bonding them using heat or high frequency waves, and then inflating it by injecting air between the films are often used. However, it was difficult to develop an apparatus for manufacturing these shock-absorbing means with substantially high economical efficiency. Accordingly, the invention provides an apparatus for manufacturing a shock-absorbing material with economical efficiency, and enhanced productivity without looseness or extension, as the plastic sheet or films rolled on a plurality of rolls are bonded by heat at a constant interval while unrolling them.

11 Claims, 5 Drawing Sheets

[Fig. 1]
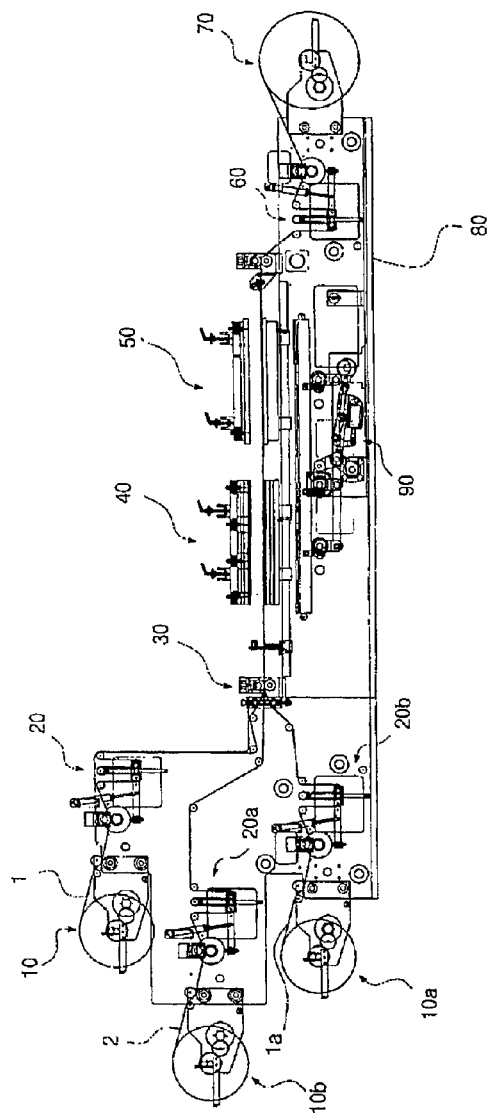
[Fig. 2]
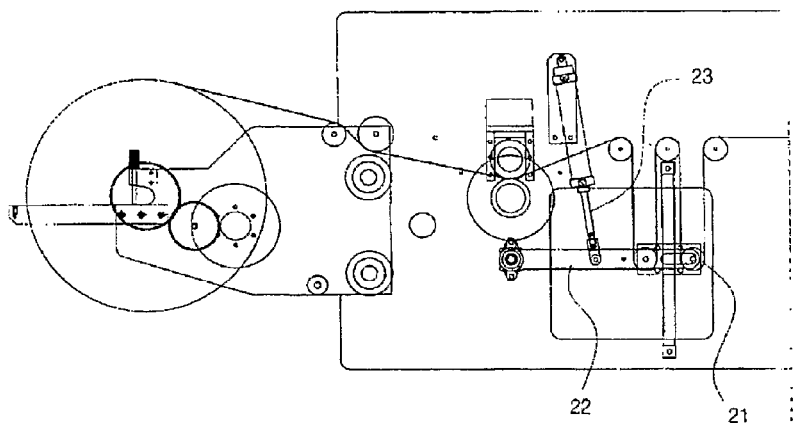

[Fig. 3]
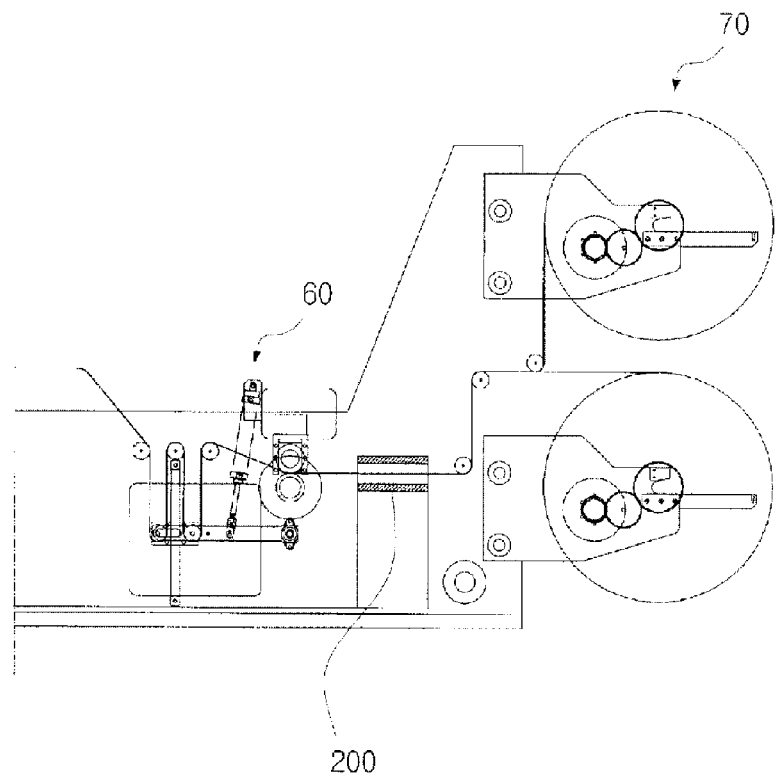
[Fig. 4]
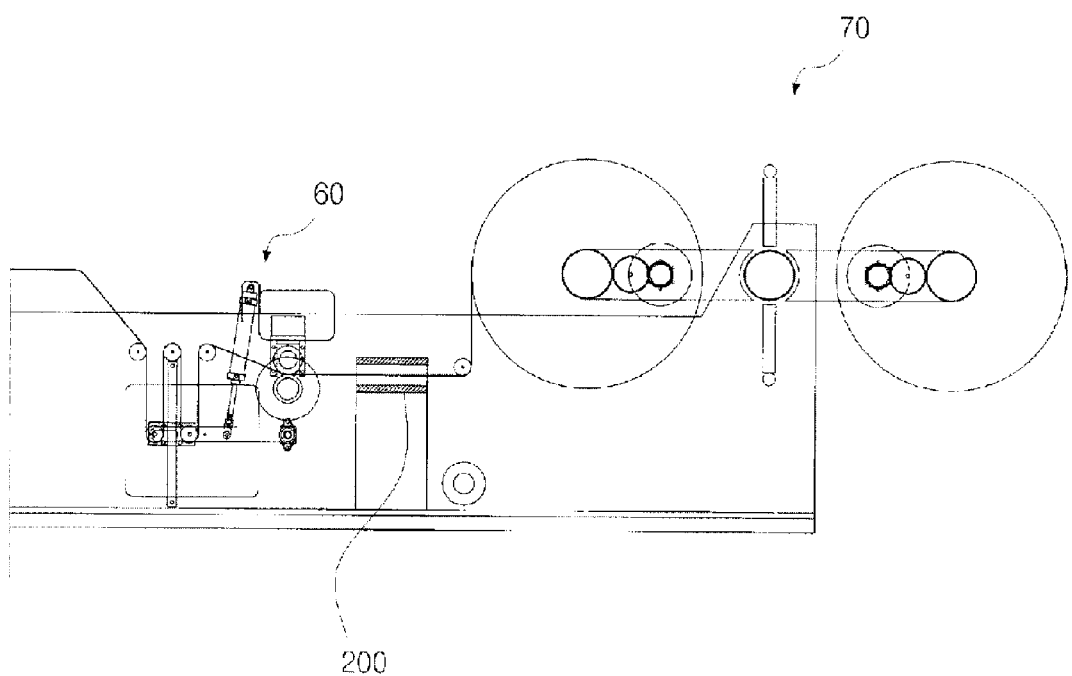

[Fig. 5]
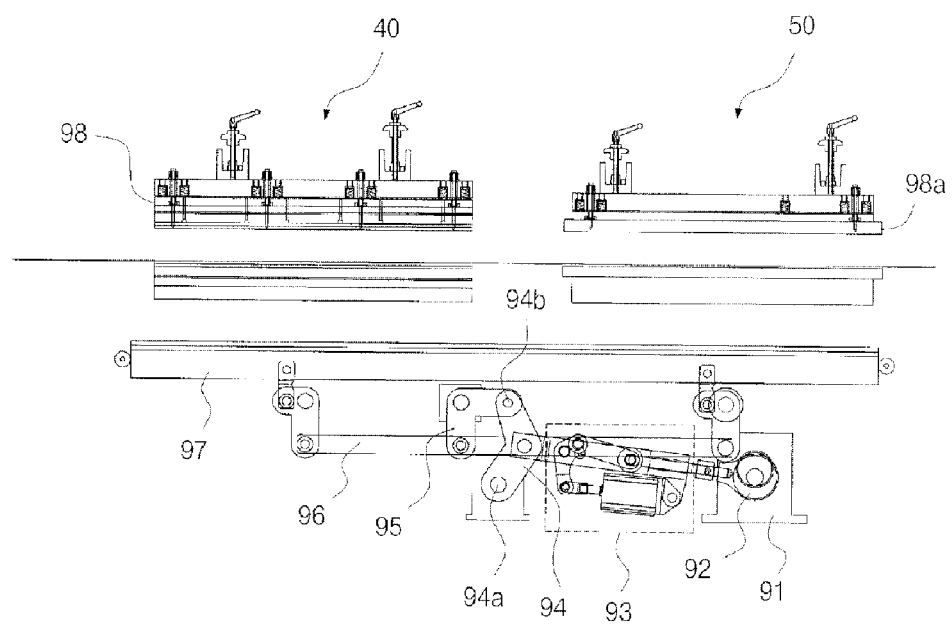
[Fig. 6]
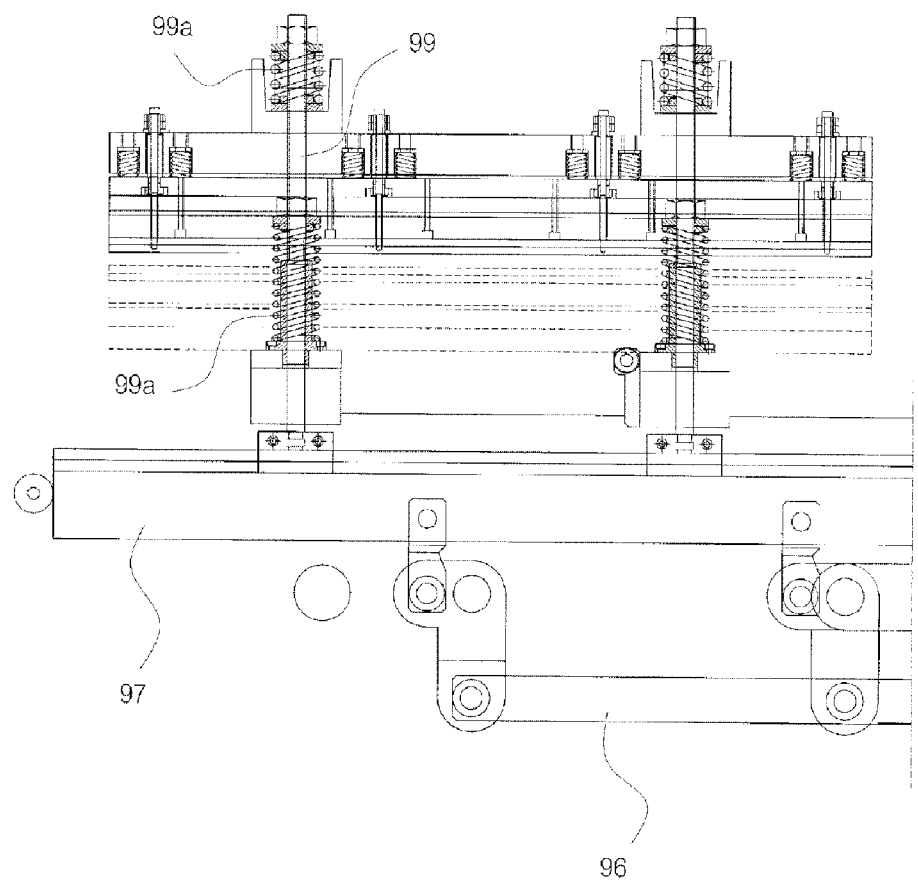

[Fig. 7]
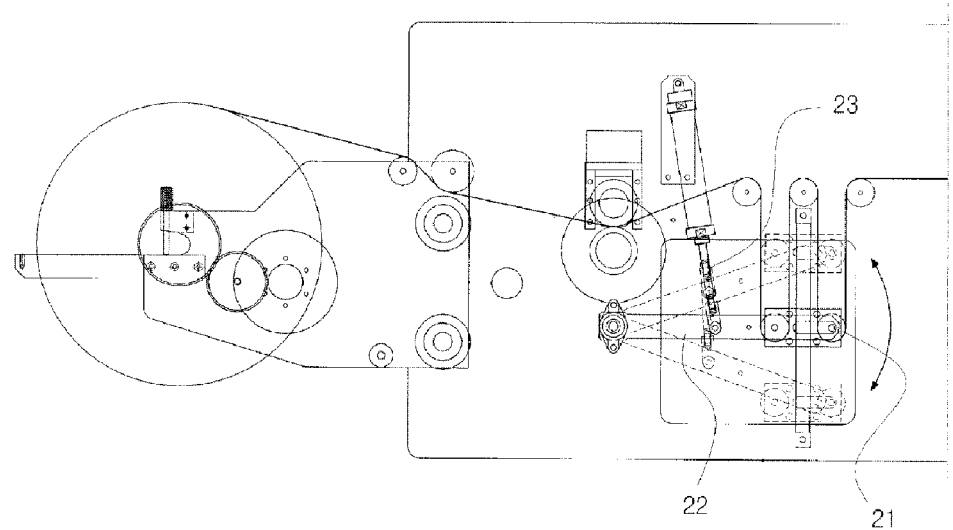
[Fig. 8]
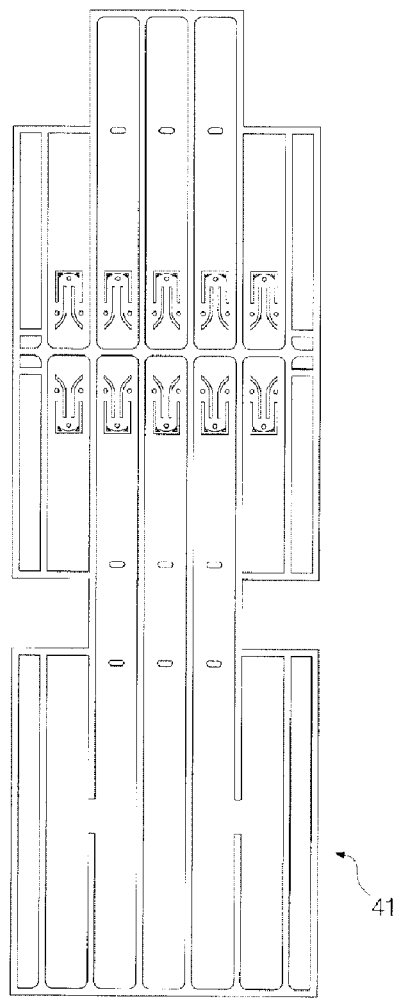

[Fig. 9]
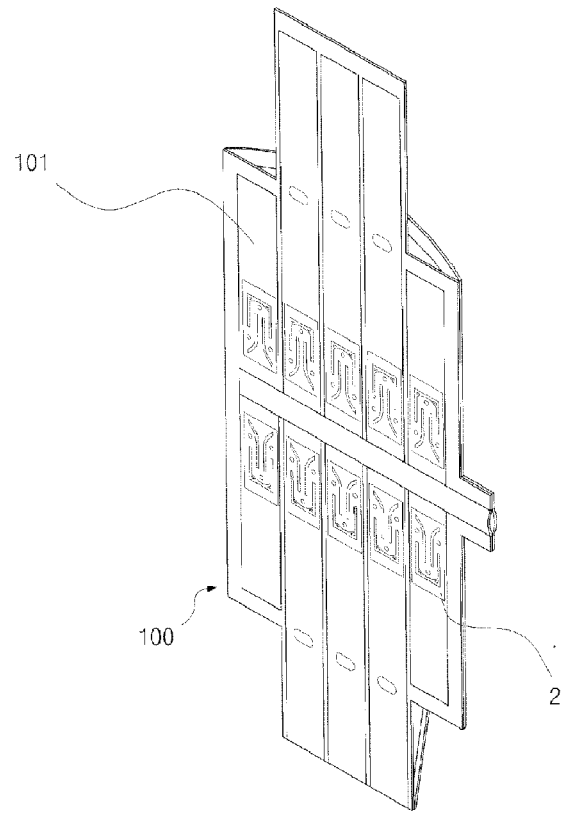
[Fig. 10]
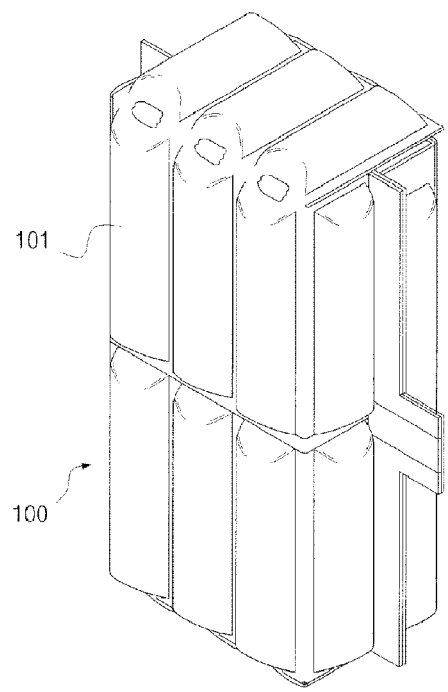

MANUFACTURING MACHINE OF PACKING MATERIAL INFLATED WITH AIR

TECHNICAL FIELD

The present invention is related to a shock-absorbing material that is formed by compiling plastic films or sheets, bonding them using a pressing force with heat, forming a shape of air bags through cooling, and then injecting air, and to an apparatus for manufacturing a shock-absorbing packing material inflated with air.

BACKGROUND ART

Polystyrene plastic made of foamed plastic has been commonly used as a shock-absorbing packing material for preventing damage of all products to be packed. However, polystyrene plastic has been forbidden or will be forbidden in most countries because it causes environmental pollution. Accordingly, a new type of shock-absorbing packing material has been required. Having been proposed to meet the above requirements, a shock-absorbing packing material inflated by air that is formed in a tube shape that is inflated by injecting air is used as a shock-absorbing packing means that is formed by compiling a plurality of layers of plastic films or sheets, bonding them using a pressing force with heat or high frequency, and then inflating it by injecting air.

DISCLOSURE OF INVENTION

Technical Problem

It has been required to develop a complete shock-absorbing material so that a shock-absorbing means inflated by air functions as a complete shock-absorbing packing material. Therefore, the applicant has developed a shock-absorbing packing material in which air is injected into a plurality of air bags through one air injection port, air does not leaks out of the air bags without specific opening/closing means once injection is completed, and although air leaks out of an air bag, the air in the other air bags does not leak. However, it was difficult to manufacture the shock-absorbing packing material in great quantities, so that it had little economical efficiency.

Technical Solution

The present invention provides to an apparatus for manufacturing a shock-absorbing packing material inflated by air that easily and economically manufactures the shock-absorbing packing material inflated by air. In particular, the invention provides an apparatus for manufacturing a shock-absorbing material inflated by air having improved productivity, in which as rolls with plastic sheets or films rolled that are disposed up and down or left and right and wiring rolls with a valve film or sheet bonded in the overlapping condition simultaneously rotate, the plastic sheets and films are unrolled, compiled, and then bonded by pressure with heat, and the bonded sheets of films are conveyed for simultaneous cooling, and looseness or extension of the sheets or films are prevented even in the conveying.

ADVANTAGEOUS EFFECTS

According to an apparatus for manufacturing a shock-absorbing packing material inflated by air, a sealed shock-absorbing material is formed at one compiling, it is possible to accurately fix the shock-absorbing packing material because it is possible to seal and cool the shock-absorbing packing material at one time, and any additional force is not applied to the shock-absorbing packing material though in sealing, stop, or rotation of the rolls or wiring rolls. Accordingly, not only is it easy to manufacture the apparatus for manufacturing a shock-absorbing packing material inflated by air, but it also is possible to manufacture the shock-absorbing packing material inflated by air having a complete structure in great quantities.

BRIEF DESCRIPTION OF THE DRAWINGS

FIG. 1 is a schematic view showing a system configuration of the entire apparatus of the invention.

FIG. 2 is an enlarged view illustrating main parts of rolled sheets or films.

FIGS. 3 and 4 are enlarged views illustrating main parts of re-rolling rolls.

FIG. 5 is a schematic view illustrating a sealing unit and a cooling unit.

FIG. 6 is a schematic enlarged view illustrating the operation of the sealing unit and the cooling unit.

FIG. 7 is a schematic view illustrating the operation of a tension unit.

FIG. 8 is a plan view of a mold used in the invention.

FIG. 9 is a perspective view of a product manufactured by the mold.

FIG. 10 is a perspective view after air injection is completed.

BEST MODE FOR CARRYING OUT THE INVENTION

Hereinafter, the invention will be described in detail with reference to the accompanying drawings.

First, basic configuration of the invention will be described with reference to FIG. 1. As shown in FIG. 1, roll units 10 and 10*a* where a plastic sheet or film 1 is disposed above and below to form air bags and air passages and is rolled therearound are installed at a predetermined distance from each other. A roll unit 10*b* is provided between the roll units 10 and 10*a*. The roll unit 10*b* is provided with a rolled valve film or sheet 2. When a plastic film or the sheet is compiled and bonded, the rolled valve film or sheet 2 is compiled, sealed, and then provided with air passages formed by the printing surface of a printing unit that prevents from being adhered. A sealing unit 40 bonds the sheets or films 1 and 2, which are unrolled from the roll units 10, 10*a*, 10*b* and then compiled through corresponding unrolling tension control units 20, 20*a*, 20*b* into a compiling unit 30, so as to have a shape of a shock-absorbing packing material 100 by applying hot-pressing using a sealing mold 41 according to arrangement shapes of air bags 101 to be sealed as shown in FIG. 8, and the shock-absorbing packing material bonded at the sealing unit 40 is conveyed to a cooling unit 50 for cooling, pass through a tension control unit 60, and then rolled on a re-rolling roll unit 70.

The rolling and unrolling are separately controlled by corresponding servomotors and these operations are performed such that the sheets or films are rolled or unrolled in accurate lengths on the basis of detecting signals.

Of the servomotors, one having a larger capacity than the other is used for the unrolling part rather than the re-rolling part, which depends on the rolling conditions.

Further, as for the operations of the sealing unit 40 that seals the sheets or films by applying hot-pressing and the cooling unit 50 that cools the sheets or films sealed by hot-pressing, in a driving unit 90 mounted at the lower portion of a main body 80, as a main motor 91 rotates, an eccentric cam 92 that is connected to the main motor 91 is rotated by a driving force transmitted from the main motor 91, a reciprocating part 93 reciprocates forward and backward by the rotation of the cam 92, a lower portion of a crank 94 pivots on a point 94a and the upper portion 94b reciprocates up and down by the reciprocation of the reciprocating part 93, and a movable bar 96 reciprocates up and down by a link member 95 with the movable bar 96 that is connected with the upper end 94b, which simultaneously reciprocates up and down a heating mold 98 and a cooling mold 98a that are connected through a long shaft 99.

The heating mold 98 and the cooling mold 98a each have the long shaft 99 that is elastically supported by a spring 99a and generates a pressing force for hot-pressing when descending. The pressing force is automatically released while the molds are returned by the return force of the spring after sealing is completed.

The boding force during the sealing by the hot-pressing depends on whether the sheets or films bonded after being compiled are stacked in two layers or four layers. Therefore, the bonding force is uniformly maintained by changing the difference in the pressing force or temperature.

The shock-absorbing packing material 100 sealed by the above operation stops, not being conveyed, while being sealed. When the shock-absorbing packing material is moved from the stop position for sealing and cooling, it moves to the cooling unit through the sealing unit in the compiled condition. The shock-absorbing packing material is held up and down by the unrolling tension control units 20, 20a, 20b, a guide roller 21 is mounted on an actuating shaft 22 that pivots on an end in the unrolling tension control units 20, 20a, and 20b, the actuating shaft actuates a shock-absorbing shaft 23, and the shock-absorbing packing material 100 is pulled without being unrolled from the rolls 10, 10a, and 10b by the shock-absorbing operation of the guide roller 21 of the tension control unit 20. After the shock-absorbing packing material is pulled, detecting signals are generated by the operation of the shock-absorbing shaft 23, the servomotor is operated in response to the signals to rotate the rolls to unroll the sheet or film, and then the tension control unit returns to the initial state.

Further, after sealing is completed, similarly, when the tension unit is formed, sealing stops, and the shock-absorbing packing material is rolled on a wiring roll, a direct force is not transmitted while being pulled by the tension unit.

Further, a static electricity prevention device 200 is provided before rolling of the shock-absorbing packing material on the roll, so that it is possible to remove static electricity that is generated by friction in rolling.

Further, when the shock-absorbing packing material is rolled on the wiring roll in the compiled condition, so that it cannot be rolled until it is completely unrolled from the roll. Therefore, as shown in FIGS. 3 and 4, a complete operation is possible through one process by providing a plurality of re-rolling rolls and rotating them.

INDUSTRIAL APPLICABILITY

An apparatus for manufacturing a shock-absorbing packing material according to the invention is applicable for economically and easily mass-producing an air injection type shock-absorbing packing material inflated by air that is used as a shock-absorbing means in packing by injecting air to inflate.

Although the present invention has been described in connection with the preferred embodiments of the invention with reference to the accompanying drawings, it is not limited to the embodiments described herein, and it will be apparent to those skilled in the art that various modifications and changes may be made thereto without departing from the scope and spirit of the invention. Therefore such modifications and changes are intended to be embraced by the claims.

The invention claimed is:

1. An apparatus for manufacturing a shock-absorbing packing material inflated with air, comprising:
    roll units (10 and 10a) installed at a predetermined distance on which plastic sheets or films (1) are rolled;
    a roll unit (10b) that is disposed between the roll units (10, 10a) and provided with a roll around which a valve film or sheet (2) is rolled;
    unrolling tension control units (20, 20a, and 20b) that applies shock absorption to the sheet or film (1, 2) unrolled from the roll units (10, 10a, and 10b);
    a compiling unit (30) that compiles the shock-absorbed sheet or films through the unrolling tension control units (20, 20a, and 20b);
    a sealing unit (40) that applies heat to the sheet or films compiled at the compiling unit (30) to form a desired-shaped shock-absorbing packing material;
    a cooling unit (50) that cools the heat-sealed shock-absorbing packing material at the sealing unit (40);
    a wiring tension control unit (60) that applies shock absorption to the shock-absorbing packing material conveyed from the cooling unit (50) after cooling; and,
    a re-rolling roll unit (70) that is disposed at a rear side of the wiring tension control unit (60).

2. The apparatus according to claim 1, wherein rolling and unrolling of the roll units (10, 10a, 10b, and 70) are separately controlled by corresponding servomotors such that the rolling and unrolling are performed to ensure predetermined length on the basis of corresponding detecting signals.

3. The apparatus according to claim 2, wherein a servomotor having a larger capacity than the other servomotors is used for the unrolling part rather than the re-rolling part.

4. The apparatus according to claim 1, wherein the sealing unit and the cooling unit operate such that in a driving unit mounted at the lower portion of a main body, as a main motor rotates, an eccentric cam that is connected to the main motor is rotated by a driving force transmitted from the main motor, a reciprocating part reciprocates forward and backward by the rotation of the cam, a lower portion of a crank pivots on a point and the upper portion reciprocates up and down by the reciprocation of the reciprocating part, and a movable bar reciprocates up and down by a link member with the movable bar that is connected with the upper end, thereby simultaneously reciprocating up and down a heating mold and a cooling mold that are connected through a long shaft.

5. The apparatus according to claim 4, wherein the heating mold and the cooling mold each have the long shaft that is elastically supported by a spring and generates a pressing force for hot-pressing when descending, and the pressing force is automatically released while the molds are returned by the return force of the spring after sealing is completed.

6. The apparatus according to claim 1, wherein during the sealing by applying hot-pressing, a bonding force depends on whether the sheets or films bonded after being compiled are stacked in two layers or four layers; therefore, the bonding force is uniformly maintained by changing the difference in the pressing force or temperature.

7. The apparatus according to claim 1, wherein a guide roller of the unrolling tension control units is mounted on an actuating shaft that pivots on an end thereof, the actuating shaft actuates a shock-absorbing shaft (23), and the shock-absorbing packing material is pulled without being unrolled from the rolls by the shock-absorbing operation of the guide roller of the tension control unit (20).

8. The apparatus according to claim 7, wherein detecting signals are generated by the operation of the shock-absorbing shaft (23), the servomotor is operated by the signals to rotate the rolls to unroll the sheet or film, and then the tension control unit returns to the initial state.

9. The apparatus according to claim 1, wherein a force is not directly transmitted to the re-rolling roll when being pulled by the tension unit.

10. The apparatus according to claim 1, wherein a static electricity prevention unit is disposed at a front side of the re-rolling roll.

11. The apparatus according to claim 1, wherein the re-rolling roll completes the operation in one process by providing a plurality of re-rolling rolls and rotating the re-rolling rolls.

* * * * *